United States Patent

Du et al.

[11] Patent Number: 6,055,121
[45] Date of Patent: Apr. 25, 2000

[54] OPTIMIZING TRACK ADDRESS DETECTION IN A DISC DRIVE

[75] Inventors: Ke Du, Oklahoma City; William C. Little; Matthew C. Burton, both of Edmond, all of Okla.

[73] Assignee: Seagate Technology Inc., Scotts Valley, Calif.

[21] Appl. No.: 08/920,592

[22] Filed: Aug. 29, 1997

Related U.S. Application Data

[60] Provisional application No. 60/035,534, Jan. 16, 1997.

[51] Int. Cl.[7] .................................................. G11B 5/596
[52] U.S. Cl. ..................................... 360/77.07; 360/78.04
[58] Field of Search ................................... 360/77.06, 75, 360/77.01, 77.02, 77.08, 77.11, 78.04, 78.14, 29, 53, 77.07

[56] References Cited

U.S. PATENT DOCUMENTS 5,262,907 11/1993 Duffy et al. .
5,276,662 1/1994 Shaver, Jr. et al. .
5,422,760 6/1995 Abbott et al. .
5,631,999 5/1997 Dinsmore .
5,801,896 9/1998 Freitas ................................... 360/77.08

*Primary Examiner*—Andrew L. Sniezek
*Attorney, Agent, or Firm*—Crowe & Dunlevy

[57] ABSTRACT

An apparatus and method for optimizing detection thresholds used to identify addresses of tracks in a disc drive having a head and a disc upon which a plurality of tracks are defined, the tracks including track address fields in which track address information is stored. A comparator is provided which generates track address sequence signals in response to a corresponding plurality of readback signals obtained as the head is maintained in a fixed relationship to a selected track. A demodulator identifies erroneous track address sequence signals therefrom and increments a count in an accumulator for each detected, erroneous signal. A detection threshold circuit sequentially provides the comparator with a set of detection thresholds from a population of detection thresholds, each of which are used in turn by the comparator. An optimal set of thresholds is thereby selected for use by the disc drive in accordance with the relative number of erroneous track address sequence signals accumulated for each of the detection thresholds from the population.

18 Claims, 6 Drawing Sheets

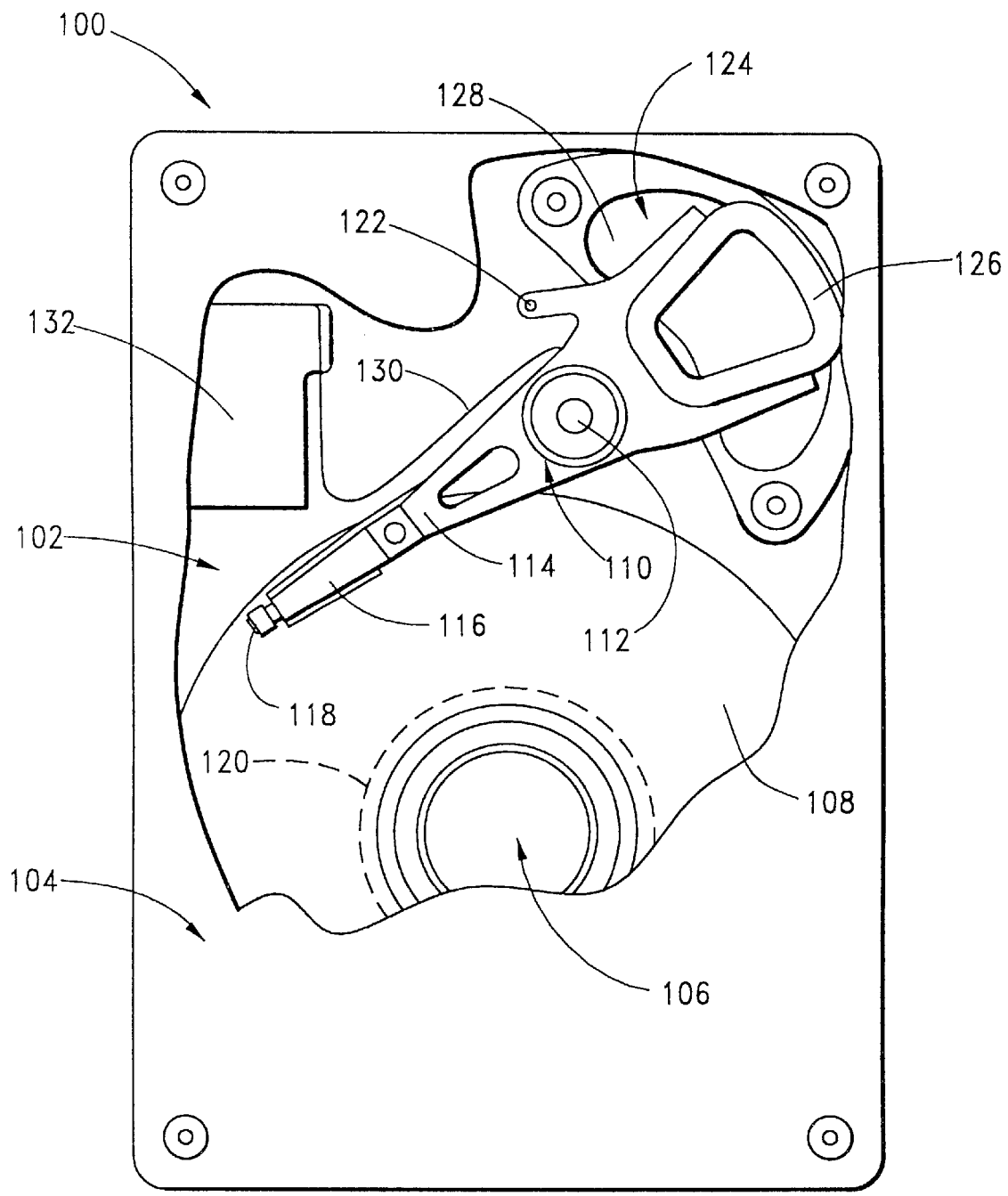
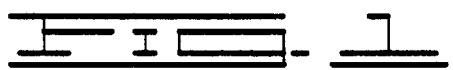

OPTIMIZING TRACK ADDRESS DETECTION IN A DISC DRIVE

RELATED APPLICATIONS

This application claims priority to Provisional Application No. 60/035,534 filed Jan. 16, 1997.

FIELD OF THE INVENTION

This invention relates generally to the field of disc drive storage devices, and more particularly, but not by way of limitation, to optimizing the detection of track addresses stored in track address fields on tracks of a disc drive.

BACKGROUND OF THE INVENTION

Hard disc drives are commonly used as the primary data storage and retrieval devices in modern computer systems. In a typical disc drive, data are magnetically stored on one or more discs that are rotated at a constant high speed and accessed by a rotary actuator assembly having a plurality of read/write heads that fly adjacent the surfaces of the discs.

The rotary actuator assembly further includes a coil of a voice coil motor, so that the heads are positioned relative to the discs in response to the application of current to the coil. A read channel and an interface circuit, responsive to the heads, are provided to transfer previously stored data from the discs to the host computer.

A closed loop digital servo system such as disclosed in U.S. Pat. No. 5,262,907 issued Nov. 16, 1993 to Duffy et al., assigned to the assignee of the present invention, is typically used to control the position of the heads relative to tracks on the discs. The tracks are defined from servo information that is written to the surfaces of the discs during manufacturing. The servo system of a disc drive thus utilizes the servo information in the performance of two primary operations: seeking and track following.

Generally, a seek operation entails the movement of a selected head from an initial track to a destination track. A velocity-control approach is typically employed wherein the velocity of the head is measured and compared to a velocity profile which defines an optimum velocity trajectory for the head as it moves to the target track. The velocity profile is typically arranged as a series of target velocities in terms of the number of tracks remaining in the seek; that is, the number of "tracks to go" until the target track is reached. Thus, during a seek the location and velocity of the head is repetitively determined and current is applied to the actuator coil in proportion to the difference between the measured velocity and the target velocity of the head.

Track following entails the continued positioning of a head over a corresponding, selected track. A position-control approach is typically employed wherein the relative position of the head with respect to the center of the track is determined and compared to a desired position for the head (whether over the center of the track, or a selected percentage of the width of the track away from the center of the track). A position error signal (PES) indicative of position error is generated therefrom and used to control the amount of current that is applied to the actuator coil in order to maintain the head at the desired position relative to the track.

It will be recognized that in both track following and seek modes of operation, it is essential that the servo system accurately determine the address of the track over which the head is located. During a seek operation, for example, misidentification of the track address can lead to errors in the trajectory of the head, potentially resulting in the head settling upon the wrong track (and requiring additional time for the head to be positioned over the intended, destination track). Similarly, during track following, misidentification of the track being followed can result in the declaration of a servo fault, causing a suspension of a read or write operation until the head is determined to be over the proper track.

As is known in the art, each of the blocks of servo information written to the discs typically includes a track address field in which track address information is stored. It is common to encode this track address information in the form of Gray code (GC), which generally comprises a multi-bit sequence, with each value in the sequence corresponding to a physical track address. Unlike a typical binary sequence, however, only one bit in the GC sequence changes as the head moves to each adjacent track, in order to facilitate improved track address detection. Accordingly, each track is assigned a unique GC value and the total number of GC bits in each value is selected to accommodate the total number of tracks on each disc.

When a head reads a track address field (also referred to as a "Gray code" or "GC" field), an analog GC readback signal is obtained having both positive and negative peaks, as well as baseline portions disposed between adjacent peaks, with the baseline portions ideally having an amplitude near zero. The readback signal is compared to both positive and negative detection thresholds and digitized into either ones or zeros, depending upon whether the signal is within or beyond the thresholds. A servo demodulator then checks the resulting digitized value against the value that the GC field should generate to ensure the head is over the intended track. Should an error in the resulting GC value be detected, the servo system will declare a fault condition and attempt to adjust the location of the head so as to bring the head in proper relation to the disc.

As will be recognized, a continuing trend in the industry is to provide disc drives with ever increasing data storage capacities and transfer rates. Some disc drives of the present generation have track densities greater than 3000 tracks/centimeter (8000 tracks/inch). With the use of such increased track densities, as well the use of other advances in the art such as magneto-resistive (MR) heads, modern disc drives have increasingly encountered two types of problems when decoding GC readback signals: 1) baseline shifting and 2) signal amplitude asymmetry.

Baseline shifting, or shouldering, is characterized by a positive or negative shift in the amplitude of the baseline portion of the signal between adjacent peaks so that the GC readback signal takes non-zero values at times when a corresponding ideal signal should be close to zero. When such shifting is sufficiently pronounced, the amplitude of the GC readback signal can rise above or below the positive and negative detection thresholds, respectively, resulting in the baseline portion being erroneously detected as a peak.

Signal asymmetry is characterized by differences between the maximum positive peak amplitude and the maximum negative peak amplitude in a GC readback signal. Such asymmetry can result in misdetection of portions of the readback signal. For example, the positive threshold may be of adequate magnitude to properly detect the positive peaks in the readback signal, but using an equal opposite magnitude for the negative threshold may result in a value that is too close to the baseline to ensure reliable negative peak detection. Conversely, if the positive or negative peak amplitudes in the GC readback signal are sufficiently low, such peaks will not be reliably detected when the magnitudes of the corresponding thresholds are too great.

Accordingly, there is a need in the art whereby disc drive GC readback signals can be reliably decoded in order to accurately determine head location in the drive, while accommodating continued advancements in the art which tend to degrade the GC readback signals by introducing signal asperities such as baseline shifting and signal amplitude asymmetry.

SUMMARY OF THE INVENTION

The present invention provides a method and apparatus for optimizing detection thresholds used to identify addresses of tracks in a disc drive in order to improve the ability of the drive to accurately position a head of the drive.

Generally, in accordance with the preferred embodiments of the present invention a disc drive is provided which includes a rotatable disc upon which a plurality of tracks are defined, the tracks including track address fields in which track address information is stored. The head is controllably positionable with respect to the tracks by way of a servo circuit and generates a readback signal when reading each track address field.

The servo circuit includes a comparator which generates track address sequence signals in response to a corresponding plurality of readback signals obtained as the head is maintained in a fixed relationship to a selected track and reads the track address fields disposed thereon. A demodulator identifies erroneous track address sequence signals from the population of track address sequence signals and increments a count in an accumulator for each detected, erroneous signal.

A detection threshold circuit sequentially provides the comparator with a set of detection thresholds from a population of detection thresholds, each of which are used in turn by the comparator. An optimal set of thresholds is thereby selected for use by the disc drive in accordance with the relative number of erroneous track address sequence signals accumulated for each of the detection thresholds from the population.

In one preferred embodiment, optimal sets of thresholds are identified for selected tracks disposed at both the innermost and outermost diameters of the disc and thresholds are thereafter determined for the remaining tracks using conventional interpolation techniques. Alternatively, the tracks are arranged in a plurality of zones on the surface of the disc, with the tracks in each zone having the same number of data fields (sectors). Accordingly, optimal sets of thresholds are determined for a selected track from each zone and used for all of the tracks in each zone.

The set of detection thresholds include a positive and a negative detection threshold, with the positive detection threshold used to detect positive peaks in the readback signals and the negative detection threshold used to detect negative peaks in the readback signals. Accordingly, the positive and negative detection thresholds can be equal and opposite in magnitude, or alternatively, the magnitudes of the positive and negative thresholds can be independently optimized.

These and various other features as well as advantages which characterize the present invention will be apparent from a reading of the following detailed description and a review of the associated drawings.

BRIEF DESCRIPTION OF THE DRAWINGS

FIG. 1 shows a disc drive constructed in accordance with the preferred embodiments of the present invention and includes a head which is controllably positionable adjacent the surface of a rotatable disc.

FIG. 8 provides a Detection Threshold Optimization Routine representative of programming utilized by the servo circuit in accordance with the preferred embodiments of the present invention.

DETAILED DESCRIPTION

Figure 2:
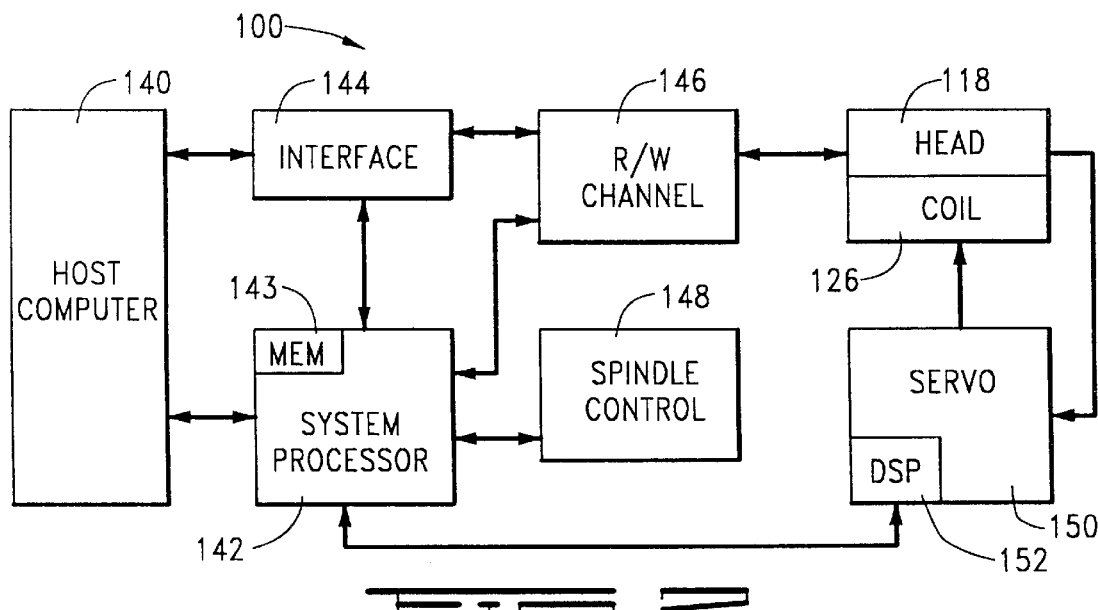
FIG. 2 provides a functional block diagram of the disc drive of FIG. 1 operably connected to a host computer in which the disc drive is mounted, with FIG. 2 including a servo circuit used to position the head of FIG. 1 relative to tracks on the disc of FIG. 1.

Referring now to FIG. 1, shown therein is a disc drive 100 constructed in accordance with the preferred embodiments of the present invention. The disc drive 100 includes a base deck 102 to which various components of the disc drive 100 are mounted. A top cover 104 (shown in partial cutaway fashion) cooperates with the base deck 102 to form an internal, sealed environment for the disc drive in a conventional manner.

A spindle motor (shown generally at 106) rotates one or more discs 108 at a constant high speed. Information is written to and read from tracks (not designated) on the discs 108 through the use of an actuator assembly 110, which rotates about a bearing shaft assembly 112 positioned adjacent the discs 108. The actuator assembly 110 includes a plurality of actuator arms 114 which extend toward the discs 108, with one or more flexures 116 extending from the actuator arms 114. Mounted at the distal end of each of the flexures 116 is a head 118 which includes a slider assembly (not separately designated) designed to fly in close proximity to the corresponding surface of the associated disc 108.

When the disc drive 100 is not in use, the heads 118 are moved over landing zones 120 near the inner diameter of the discs 108 and the actuator assembly 110 is secured using a conventional latch arrangement, a portion of which is designated at 122.

The radial position of the heads 118 is controlled through the use of a voice coil motor (VCM) 124, which as will be recognized typically includes a coil 126 attached to the actuator assembly 110 as well as one or more permanent magnets 128 which establish a magnetic field in which the coil 126 is immersed. Thus, the controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

A flex assembly 130 provides the requisite electrical connection paths for the actuator assembly 110 while allowing pivotal movement of the actuator assembly 110 during operation. The flex assembly terminates in a conventional manner at a flex bracket 132 for communication through the base deck 102 to a disc drive printed circuit board (not shown) mounted to the bottom side of the disc drive 100.

Referring now to FIG. 2, shown therein is a functional block diagram of the disc drive 100 of FIG. 1, generally showing the main functional circuits which are resident on the disc drive printed circuit board and used to control the operation of the disc drive 100.

The disc drive 100 is shown to be operably connected to a host computer 140 in which the disc drive 100 is mounted in a conventional manner. Control communication paths are provided between the host computer 140 and a disc drive system processor 142, the system processor 142 generally providing top level communication and control for the disc drive 100 in conjunction with programming for the system processor 142 stored in memory (MEM) 143. The MEM 143 can include random access memory (RAM), read-only memory (ROM) and other sources of resident memory for the system processor 142.

A disc drive interface 144 is used to transfer data between the host computer 140 and the disc drive 100, with the interface 144 including a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that have been previously stored by the disc drive 100, read signals are generated by the heads 118 and provided to the read/write channel 146, which performs decoding and error detection and correction operations and outputs the retrieved data to the interface 144 for subsequent transfer to the host computer 140. Such operation of the disc drive 100 is well known in the art and discussed, for example, in U.S. Pat. No. 5,276,662 issued Jan. 4, 1994 to Shaver et al., assigned to the assignee of the present invention.

The discs 108 are rotated at a constant high speed by a spindle control circuit 148, which electrically commutates the spindle motor 106 (FIG. 1) through the use of back electromotive force (bemf) sensing. Spindle control circuits such as represented at 148 are well known and will therefore not be discussed further herein; additional information concerning spindle control circuits is provided in U.S. Pat. No. 5,631,999 issued May 20, 1997 to Dinsmore, assigned to the assignee of the present invention.

As discussed above, the radial position of the heads 118 is controlled through the application of current to the coil 126 of the actuator assembly 110. Such control is provided by a servo circuit 150, which is shown in FIG. 2 to include a digital signal processor (DSP) 152. The DSP 152 receives commands from the system processor 142 and operates to move the head 118 from an initial track to a destination track during a seek operation and to maintain the head 118 over a selected track during a track following mode of operation. The operation of the DSP 152 in accordance with the preferred embodiments of the present invention will be discussed in greater detail below. For reference, additional information regarding typical servo circuits is disclosed in the previously referenced Duffy et al. U.S. Pat. No. 5,262,907.

Figure 3:
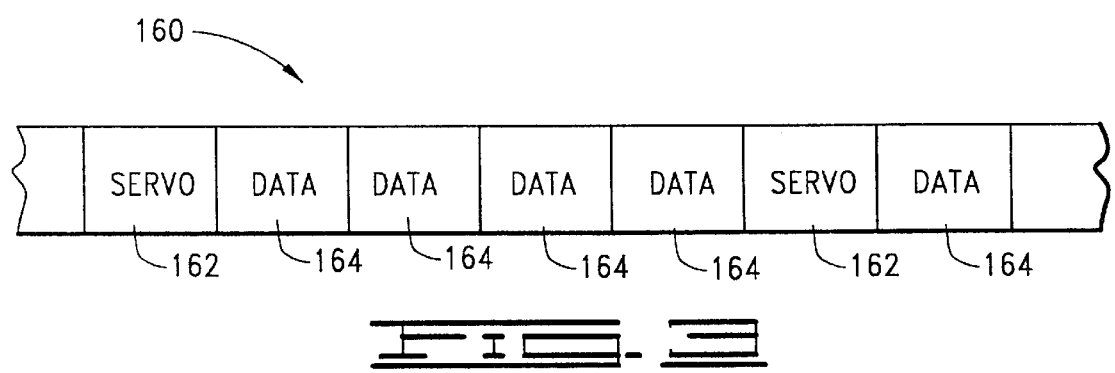
FIG. 3 illustrates a portion of a track on the disc of FIG. 1 showing the relative placement of servo fields and data fields on a typical track.

Referring now to FIG. 3, shown therein is a representation of a portion of a selected track 160 of the disc drive 100, illustrating the relative placement of servo fields 162 and data fields 164 on the track. As will be recognized, the servo fields 162 contain the servo information used by the servo circuit 150 and the data fields (sectors) 164 contain the user data stored to the disc drive 100, with the servo fields 162 embedded among the data fields 164 as shown. The actual number of data fields 164 between successive servo fields 162 and the relative length of each type of field will depend upon the particular characteristic of each disc drive.

Figure 4:
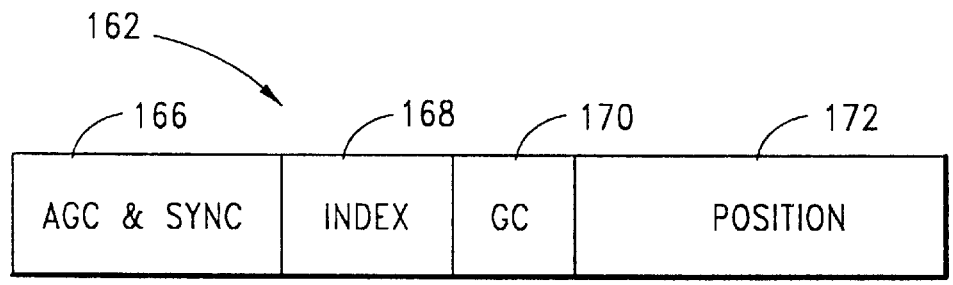
FIG. 4 illustrates various fields associated with the servo fields of FIG. 3, including a Gray code (GC) field in which track address information is stored.

FIG. 4 provides a representation of one of the servo fields 162 of FIG. 3 in greater detail. More particularly, the servo field 162 of FIG. 4 is shown to include an automatic gain control and synchronization (AGC & Sync) field 166, an index field 168, a Gray code (GC), or track address field 170 and a position field 172. Of particular interest is the GC field 170, but generally it will be recognized that the AGC & Sync field 166 provides timing and amplitude information used by the servo circuit 150 in preparation of receipt of the rest of the servo information in the servo field 162. The index field 168 provides information with regard to the angular displacement of the servo field 162 with respect to the disc. Finally, the position field 172 provides information with regard to the placement of the head relative to the center of the track 160. Those skilled in the art will appreciate that other servo field configurations can be readily used depending upon the requirements of a particular application, so that the configuration of FIG. 4 is merely illustrative in nature and not limiting to the scope of the claimed invention.

With regard to the GC field 170, a unique GC pattern is written to all such fields on each track, the pattern corresponding to the physical address of the track. As discussed above, proper operation of the servo circuit 150 requires accurate decoding of the GC readback signal obtained from the GC fields 170. However, attendant problems in the decoding of such signals will now be discussed with reference to FIGS. 5 and 6, which generally illustrate the effects of baseline shifting and signal asymmetry, respectively, upon such signals.

Figure 5:
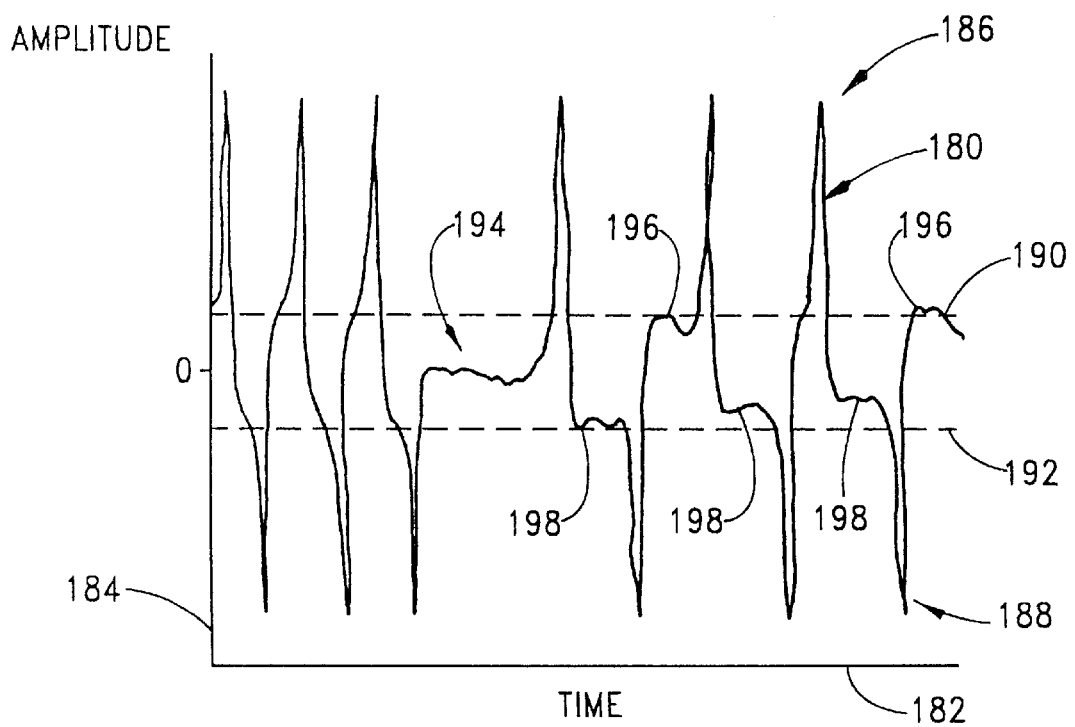
FIG. 5 provides a graphical representation of a readback signal obtained as the head of FIG. 1 reads a GC field such as shown in FIG. 4, illustrating the problems associated with baseline shifting in the readback signal.

Beginning with FIG. 5, shown therein is a graphical representation of a portion of a GC readback signal 180 in which baseline shifting is present. For purposes of discussion, it is contemplated that the signal 180 of FIG. 5 has been obtained from the reading of the GC field 170 of FIG. 4 by the associated head 118 (FIGS. 1, 2).

As shown in FIG. 5, the GC readback signal 180 is plotted against an x-axis 182 indicative of elapsed time and a y-axis 184 indicative of signal amplitude (millivolts). The GC readback signal 180 includes a series of positive peaks (denoted generally at 186) and a series of negative peaks (denoted generally at 188). Corresponding positive and negative detection thresholds 190, 192 are also shown, with the detection thresholds used to detect the occurrence of the positive and negative peaks 186, 188. The selection of the magnitudes of the detection thresholds 190, 192 in accordance with the preferred embodiments of the present invention will be discussed below.

Continuing with FIG. 5, a nominal baseline portion between successive peaks is denoted at 194, with the baseline portion 194 having a signal amplitude substantially near 0 millivolts. It will be recognized that the baseline portion 194 is representative of an ideal, desired baseline response. However, not all of the baseline portions in the signal 180 are so well-behaved. Particularly, baseline portions having undesirable positive baseline shifting are represented at 196 and baseline portions having undesirable negative baseline shifting are represented at 198. As shown in FIG. 5, such shifting is sufficient at some locations to exceed the positive and negative detection thresholds 190, 192, respectively, and would thus likely result in misdetection of the GC readback signal 180 at these locations.

Figure 6:
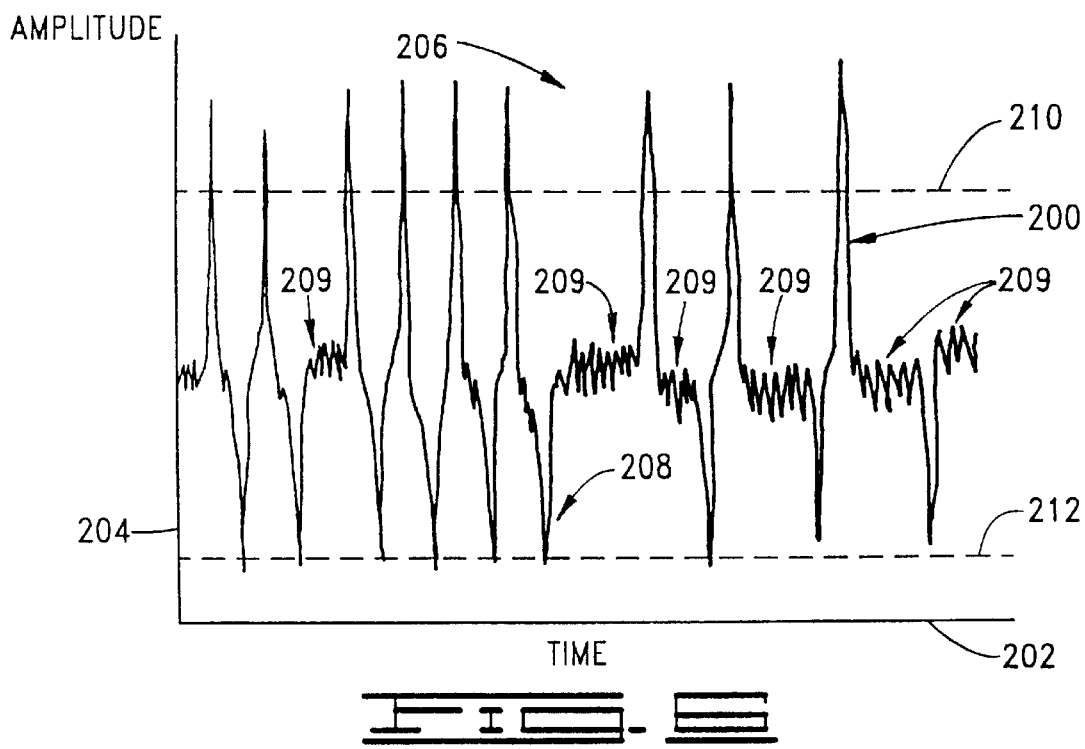
FIG. 6 provides a graphical representation of another readback signal obtained as the head of FIG. 1 reads a GC field such as shown in FIG. 4, illustrating the problems associated with signal amplitude asymmetry in the readback signal.

Referring now to FIG. 6, shown therein is a graphical representation of a portion of a GC readback signal 200 characterized by signal amplitude asymmetry. The signal 200 is plotted against an x-axis 202 indicative of elapsed time and a y-axis 204 indicative of signal amplitude (millivolts) and includes a plurality of positive peaks (denoted generally at 206) and a plurality of negative peaks (denoted generally at 208). Although baseline portions (denoted generally at 209) between successive peaks are reasonably well-behaved, it can be seen that the positive peaks 206 have magnitudes that are substantially greater than the magnitudes of the negative peaks 208. Accordingly, use of positive and negative detection thresholds such as at 210, 212 respectively, could lead to misdetection of portions of the signal 200, in that the magnitude of the negative detection threshold 212 is substantially that of the average amplitude of the negative peaks 208.

Figure 7:
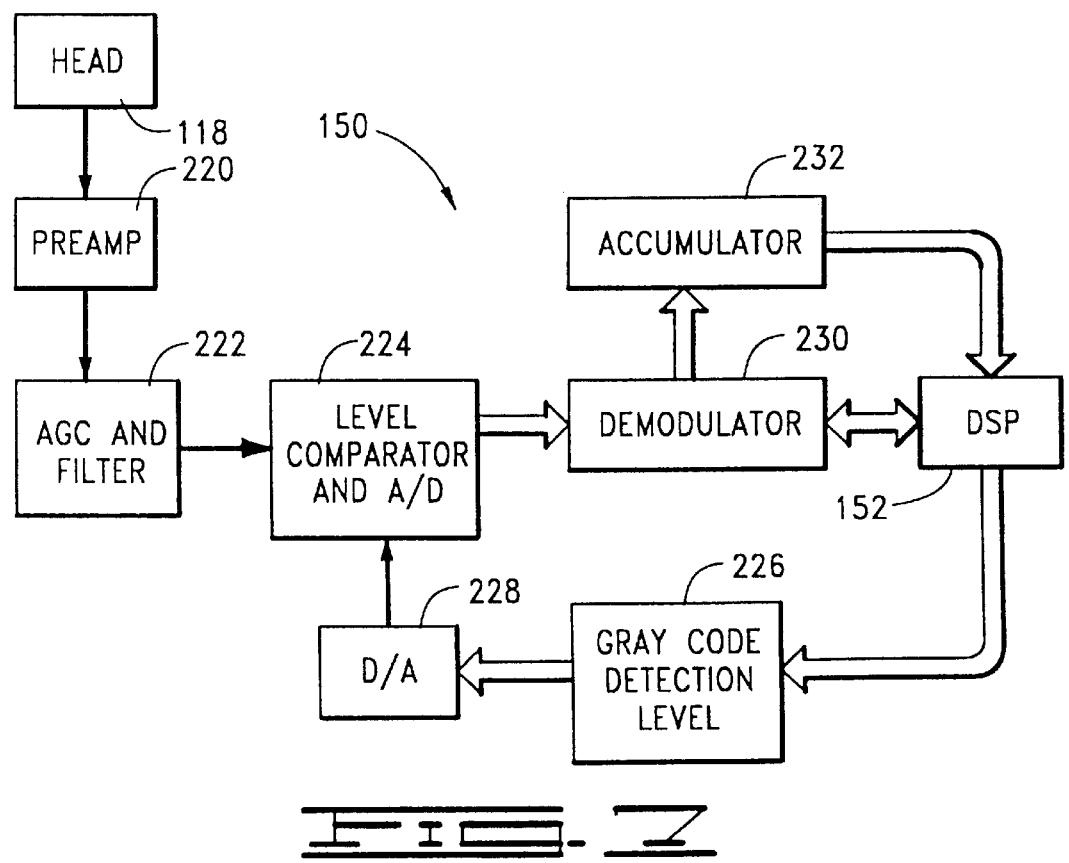
FIG. 7 provides a functional block diagram of a portion of the servo circuit of FIG. 2, constructed in accordance with the preferred embodiments of the present invention.
Figure 5:
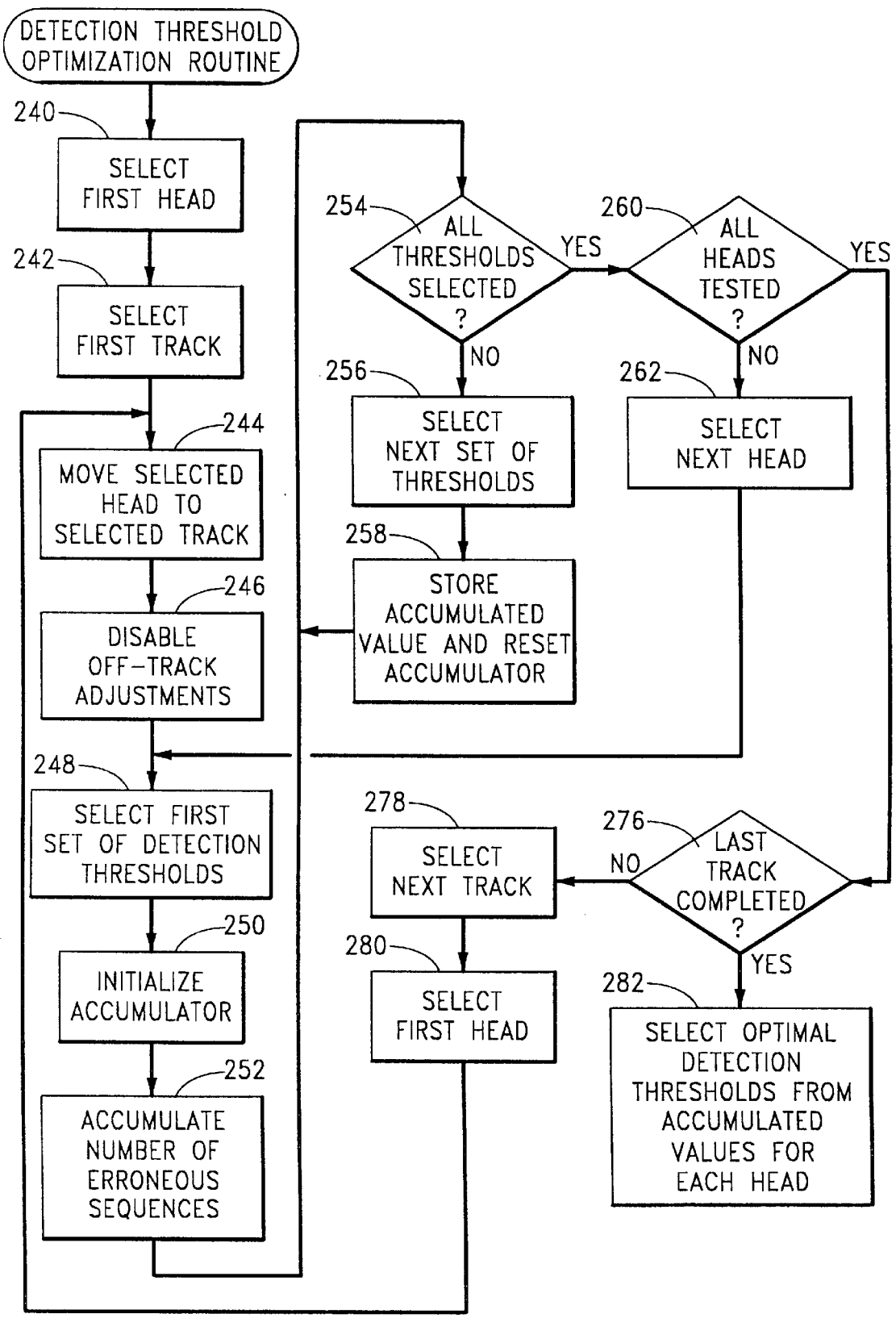

Referring now to FIG. 7, shown therein is a functional block diagram illustrating relevant portions of the servo circuit 150 of FIG. 2 in accordance with the preferred embodiments of the present invention. More particularly, FIG. 7 illustrates the general functional aspects of the servo circuit 150 with regard to the operation of the disclosed embodiments; hence, it will be understood that selected blocks in the diagram could be readily implemented in hardware or, alternatively, in software (firmware) executed by the DSP 152.

With reference to FIG. 7, at such time that a selected head 118 passes over and reads a selected one of the GC fields 170 (FIG. 3), a GC readback signal (such as the signal 180 of FIG. 5 or the signal 200 of FIG. 6) is generated and provided to a preamp circuit 220, which performs preliminary preamplication and detection operations upon the signal. An automatic gain control (AGC) and filter block 222 next applies frequency domain filtering and signal amplitude adjustment to the preamplified readback signal in order to prepare the signal for further processing by remaining portions of the servo circuit 150.

The signal is then provided to a level comparator and analog to digital (A/D) converter circuit 224 (hereinafter referred to as the "comparator"). The comparator 224 applies positive and negative detection thresholds to the signal, such as, for example, the thresholds 188, 190 of FIG. 5 or the thresholds 210, 212 of FIG. 6. The thresholds are initially provided in digital form from a Gray code Detection Level circuit 226 and converted to analog form by a digital to analog (D/A) converter 228. The thresholds are applied to the readback signal so as to generate a two-state analog signal, with a first state corresponding to portions of the readback signal above the positive threshold and below the negative threshold, and a second state corresponding to portions of the readback signal falling within the positive and negative thresholds. The comparator 224 then applies A/D conversion to the two-state analog signal to output a corresponding digital sequence ("GC sequence") to a demodulator 230.

The demodulator 230 uses the GC sequence to identify the physical track address over which the head 118 is disposed, as is typical during normal disc drive operation. For example, during a track following mode of operation the demodulator compares the received GC sequence to a corresponding, predetermined sequence indicative of the desired track address; differences between these sequences are normally interpreted as an off-track error in the position of the head 118. The DSP 152 will declare a fault condition and issue a current command signal to driver circuitry (not shown) of the servo circuit 150 in order to adjust the position of the head back over the desired track in response to this detected error. From this, it will be recognized that conditions causing misdecoding of the GC sequence (such as to induce baseline shifting or signal asymmetry as discussed above) will result in the false detection of off-track errors and the unnecessary declaration of fault conditions. It is to the improvement in the ability of a servo circuit (such as the servo circuit 150) to accurately identify track addresses that the preferred embodiments of the present invention are directed.

Accordingly, FIG. 7 is shown to further include an accumulator 232 operably connected to the demodulator 230, the accumulator 232 accumulating the number of errors detected by the demodulator 230 in accordance with a routine set forth in FIG. 8, to which attention is now directed.

Referring to FIG. 8, shown therein is a generalized flow chart representative of the operation of the servo circuit 150 in accordance with the preferred embodiments of the present invention. More particularly, FIG. 8 illustrates a Detection Threshold Optimization Routine which is advantageously performed during manufacturing operations associated with the disc drive 100, as well as at appropriate times during the operational life of the disc drive 100, such as during disc drive initialization or idle periods. It will be recognized that the routine of FIG. 8 can be realized in programming utilized by the DSP 152, or can alternatively be implemented in hardware.

Before discussing the routine of FIG. 8 in detail, however, it may be helpful to first provide a brief overview of the routine. Generally, as provided above the purpose of the routine is to select appropriate positive and negative GC detection thresholds so as to compensate for variations within the disc drive 100 for each head-disc combination, as well as to compensate for environmental conditions and other factors that would tend to degrade the ability of the servo circuit 150 to properly decode the GC sequences retrieved from the GC fields 170. As discussed below, the routine is preferably performed at a plurality of locations on the disc (such as at inner and outer diameters or for each zone in disc drives employing zone-based recording). During the routine, a plurality of different positive and negative thresholds are applied in order to assess the number of detected erroneous GC sequences for each set of thresholds. Appropriate detection threshold levels are then selected and thereafter used in accordance with the results of this analysis.

The routine of FIG. 8 begins at block 240, wherein the first head 118 to be evaluated is selected. As discussed above, the disc drive 100 is contemplated as employing an embedded servo scheme, so that servo information is embedded on the tracks on each surface of each disc 108 as previously discussed with reference to FIG. 3. Accordingly, each of the heads 118 will in turn be selected during the performance of the routine. However, it will be noted that the routine of FIG. 8 could readily be adapted for use in a disc drive employing a dedicated servo scheme, wherein one or more of the surfaces of the discs are selected as dedicated servo surfaces. In such a configuration, servo information is exclusively provided on the surfaces of these discs and the data heads are positioned relative to the remaining disc surfaces in relation to the placement of the heads adjacent the servo surfaces. Accordingly, in such a disc drive only the servo head or heads would be selected by the routine of FIG. 8.

Continuing with FIG. 8, the routine next identifies a first selected track, as indicated by block 242. Preferably the first selected track (such as 160 in FIG. 3) is disposed near the innermost diameter of the discs 108. The operation of block 244 next causes the selected head 118 to be moved to the selected track; block 244 will thus typically include a seek operation to bring the selected head 118 over the selected track. Once the selected head 118 has settled onto the selected track and the disc drive 100 has entered a track following mode of operation (so that the selected head 108 is caused to follow the selected track), the servo circuit 150 suspends normal track following activity insofar as the response to detected off-track conditions is concerned, as indicated by block 246. More particularly, the DSP 152 is instructed to ignore reported errors in the location of the head 118 to the extent that the DSP 152 does not cause adjustments in the position of the head 118 to move the head 118 to an adjacent track in response to a detected off-track condition. This will be discussed in greater detail below.

A first set of GC detection thresholds (both positive and negative) is then selected, as indicated by block 248. Preferably, with reference to FIG. 7 the Gray code detection level circuit 226 is provided with digital representations of the first set of thresholds and the D/A 228 provides analog representations of these thresholds to the comparator 224. The accumulator 232 (FIG. 7) is then initialized to a zero count, as indicated at block 250.

The routine is now ready to evaluate the effects of the selected detection thresholds and this operation takes place as indicated at block 252, wherein the detection thresholds are used to accumulate a total number of erroneous sequences over a plurality of revolutions of the discs 108. More particularly, the servo circuit 150 causes the head 118 to remain over the selected track 160 for a series of consecutive revolutions (for example, 100 revolutions) while the GC fields 170 (FIG. 4) on the selected track are read by the head 118. Although any number of revolutions can be used, it has been found desirable to select a sufficiently large enough number of revolutions in order to obtain a statistically significant number of samples. For example, disc drives employing embedded servo systems will typically have from about 30 to 90 servo fields 162 per track; hence, using 100 revolutions will provide a total of from about 3,000 to about 9,000 GC field readings, depending upon the configuration of the disc drive. Such a large sampling will generally facilitate a thorough evaluation of the effects of the selected thresholds, as well as the characteristic effects of noise and other factors as discussed below.

In response to the reading of each GC field 170 encountered during these revolutions, as described above with reference to FIG. 7 a digital GC sequence is determined by the comparator 224 using the set of thresholds selected by the operation of block 248 (FIG. 8). Each GC sequence is compared to the predetermined sequence for the selected track by the demodulator 230. When an erroneous GC sequence is detected (i.e., a difference is detected between the decoded GC sequence and the predetermined sequence), the servo circuit 150 (FIG. 7) causes the demodulator 230 to increment a count in the accumulator 232. As provided above, during a track following mode of operation the DSP 152 would normally cause an adjustment in the position of the head 118 in response to an erroneous GC sequence; however, the purpose of the routine is to evaluate the reliability of the GC information on a known track in response to the application of various detection threshold magnitudes. Accordingly, the servo circuit 150 ignores the GC information with regard to performing off-track corrections (as provided by the operation of block 246) and instead maintains the head 118 in a fixed relationship to the disc 108 over the selected track while accumulating the total number of erroneous GC sequences in the accumulator 232.

Once the specified number of revolutions has been completed, the routine of FIG. 8 continues to decision block 254, wherein a determination is made whether all thresholds have been selected; as discussed below, in the preferred embodiments a population of sets of thresholds is initially provided for sequential evaluation by the routine. When it is determined at decision block 254 that additional thresholds remain (i.e., not all thresholds have been selected), the next set of thresholds is selected at block 256. The accumulated value in the accumulator 232 is temporarily stored by the DSP 152 and the accumulator 232 is reset to a zero count, as indicated by block 258. The operation of block 252 is then repeated using the next set of selected thresholds.

The operation of the routine of FIG. 8 thus continues until all the predetermined sets of thresholds have been selected for the selected head, after which the routine continues from decision block 254 to decision block 260, which determines whether all of the heads 118 have been tested. If not, the routine continues from decision block 260 to block 262 wherein the next head 118 is selected for testing. Each head 118 in turn is subjected to the operation of blocks 248, 250 and 252, resulting in a set of accumulated values for each head 118 at the first selected track location, the set of accumulated values corresponding to the number of detected erroneous GC sequences for each set of thresholds. For reference, an example of such a set of accumulated values is shown in FIG. 9.

Figure 9:
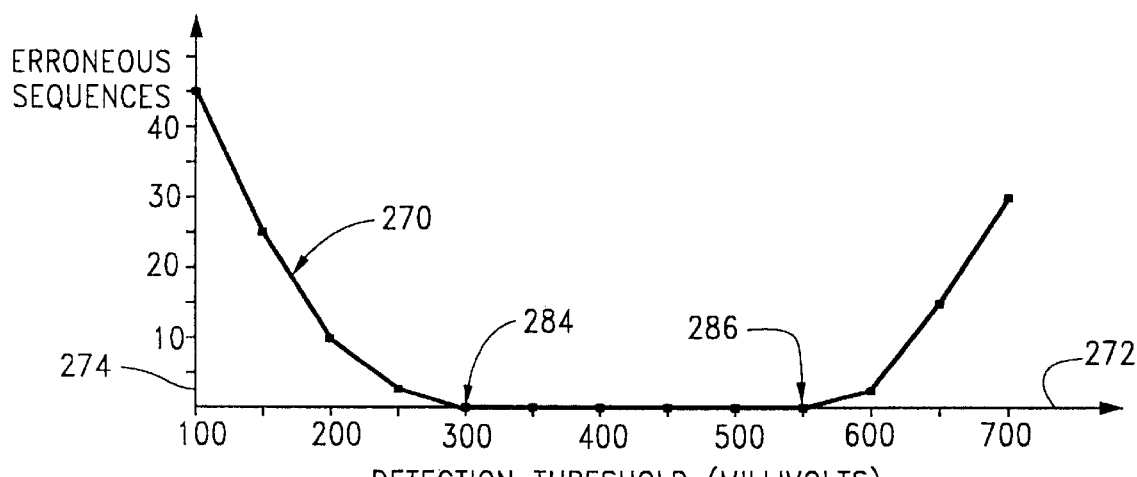
FIG. 9 provides a typical error response curve obtained from the operation of the routine of FIG. 8, from which optimal detection threshold values can be determined in accordance with the preferred embodiments.

Briefly, FIG. 9 provides an error response curve 270 plotted against an x-axis 272 indicative of a plurality of detection thresholds (measured in millivolts) and a y-axis 274 indicative of the total number of accumulated, erroneous GC sequences. For purposes of discussion, it is contemplated that the data shown in FIG. 9 is obtained as a result of the completion of the operation of blocks 248 through 252 of the routine of FIG. 8 for the first select head 118.

As shown in FIG. 9, a total of 13 sets of detection thresholds were utilized; that is, the first thresholds were ±100 millivolts, the second thresholds were ±150 millivolts, and so on up to thresholds of ±700 millivolts. As will be recognized from the graph, use of the thresholds from ±100 to ±250 and from ±600 to ±700 millivolts resulted in the detection of at least some erroneous GC sequences. However, the use of the thresholds from ±300 to ±550 millivolts resulted in no detected erroneous GC sequences.

Referring again to the routine of FIG. 8, once all of the heads 118 have been selected in turn (and corresponding erroneous GC sequences values have been accumulated) for the first selected track, the routine passes from decision block 260 to decision block 276, where the routine determines whether evaluation has been completed for the last track location. When additional track locations are to be selected, the routine continues from decision block 276 to block 278, wherein the next track is selected. The first head 118 is selected at block 280 and the routine continues back to block 244, wherein the first head is moved to the selected track. Accordingly, the routine will continue as before to accumulate values for each head 118 at each of the selected track locations. As provided above, the routine of FIG. 8 contemplates evaluating the effects of various sets of thresholds at a plurality of locations on the discs 108, and the preferred embodiments use tracks at the innermost and the outermost diameters of the discs 108 and apply interpolation techniques to arrive at appropriate thresholds for the remaining tracks on the discs 108. However, it is contemplated that other intermediate locations on the discs 108 can be selected, such as selecting a track from each zone and using the resulting thresholds for each of the tracks in each zone.

At such time that all of the heads 118 have been evaluated at each of the selected track locations, the routine passes from decision block 276 to block 282, wherein optimal detection thresholds for each head at each location on the discs 108 are selected. Generally, the operation of block 282 begins with the step of retrieving the accumulated values for the first head at the first location and identifying the minimum set of threshold values at which no erroneous GC sequences were obtained. With reference to the curve 270 of FIG. 9, this point would correspond to ±300 millivolts, as indicated at 284. Correspondingly, the operation of block 282 would also identify the maximum set of threshold values at which no erroneous GC samples were obtained, which for the example of FIG. 9 would correspond to ±550 millivolts (as indicated at 286).

The optimal threshold value will then be selected as halfway between the points 284 and 286. More generally, if T is the optimal threshold value to be selected, $T_{min}$ is the minimum value at which no erroneous sequences were detected and $T_{max}$ is the maximum value at which no erroneous sequences were detected, then:

$$T = \frac{(T_{max} - T_{min})}{2} + T_{min} \quad (1)$$

and, for the example of FIG. 9, $$T = \frac{(550 - 300)}{2} + 300 = 425 \quad (2)$$

hence, the optimal detection thresholds for the example of FIG. 9 would be ±425 millivolts. The operation of block 282 in FIG. 8 thus determines optimal thresholds for each head 118 at each of the selected track locations and stores these values for subsequent use by the servo circuit 150 during normal operation. It is contemplated that the operation of block 282 will also include the calculation and storage of thresholds for each track on each disc using conventional interpolation techniques, although the servo circuit 150 could alternatively calculate the optimal thresholds for any given track on-the-fly based upon the thresholds determined at the selected track locations. In another alternative, the servo circuit 150 determines and stores different sets of thresholds for each zone of tracks on the discs. The particular methodology employed will generally depend upon the requirements of a given application.

Figure 10:
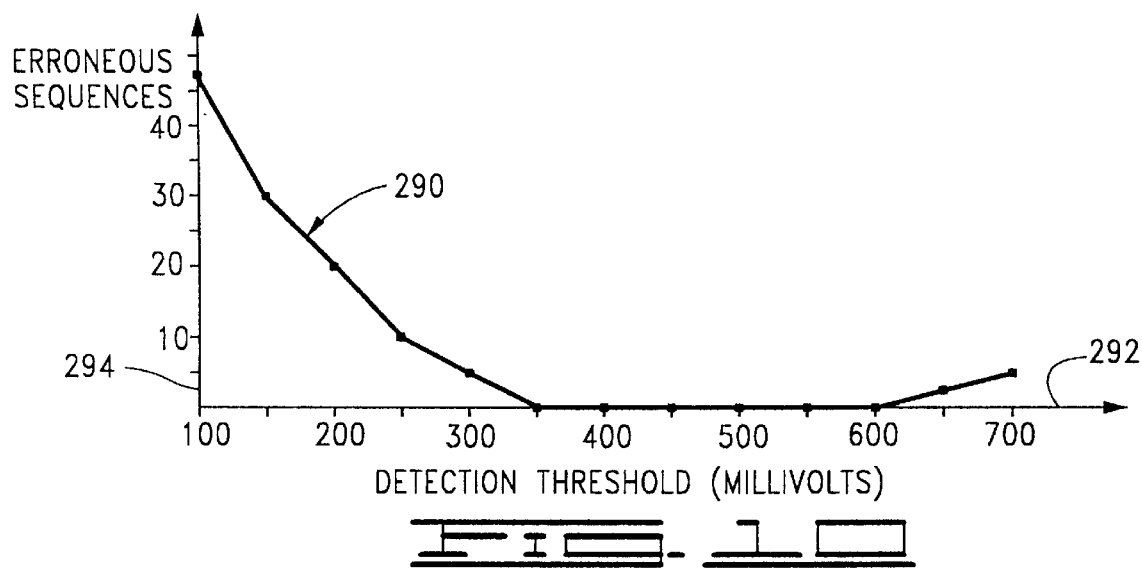
FIG. 10 provides a typical error response curve obtained from the operation of the routine of FIG. 8 corresponding to a head-track combination in which baseline shifting is present.
Figure 11:
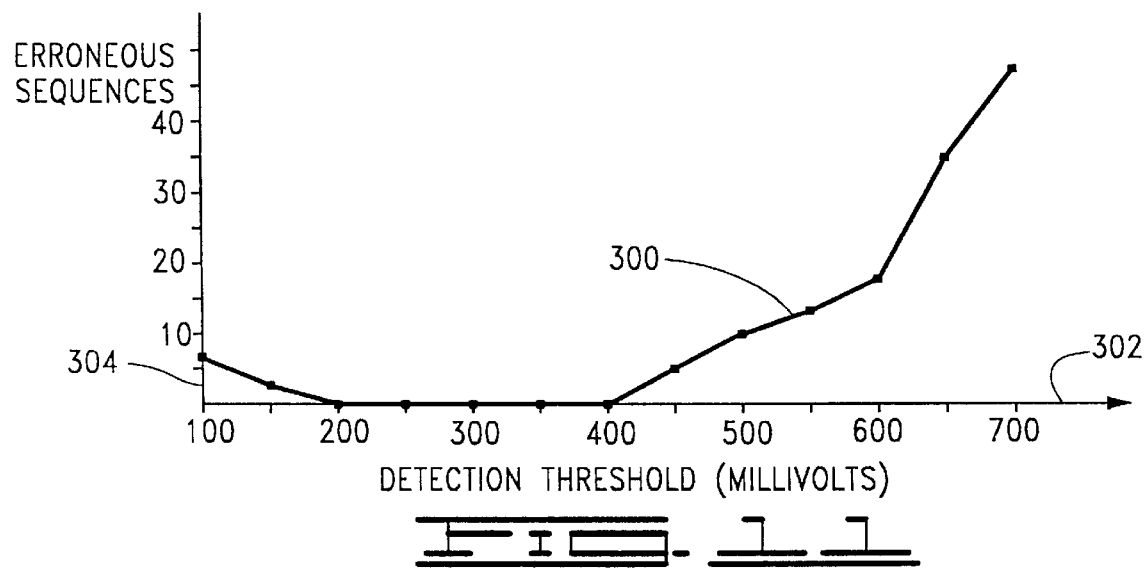
FIG. 11 provides a typical error response curve obtained from the operation of the routine of FIG. 8 corresponding to a head-track combination in which signal asymmetry is present.

For reference, FIGS. 10 and 11 have been provided which are generally indicative of typical sets of accumulated values for GC sequences for individual head-track combinations using the routine of FIG. 8. More particularly, FIGS. 10 and 11 generally illustrate the effects of baseline shifting and signal asymmetry, respectively.

Referring first to FIG. 10, shown therein is an error response curve 290 for a selected head 118 at a corresponding selected track location. As with the curve 270 of FIG. 9, the curve 290 of FIG. 10 is plotted against an x-axis 292 indicative of 13 sets of selected detection thresholds (from ±100 to ±700 millivolts) and a y-axis indicative of the total number of accumulated, erroneous GC sequences. As shown in FIG. 10, a substantial number of the lower thresholds (below ±350 millivolts) resulted in the accumulation of at least some erroneous GC sequences, which will be recognized as typically occurring as a result of substantial baseline shifting in the GC readback signals (as discussed with reference to FIG. 5). For reference, using equation (1) above, the optimal detection thresholds for the head-track combination of FIG. 10 would be 475 millivolts (that is, halfway between a $T_{min}$ of 350 millivolts and a $T_{max}$ of 600 millivolts).

Correspondingly, FIG. 11 provides an error response curve 300 plotted against an x-axis 302 indicative of 13 sets of selected detection thresholds (from ±100 to ±700 millivolts) the same set of thresholds and a y-axis 304 indicative of the total number of accumulated, erroneous GC sequences. As shown in FIG. 11, a substantial number of the higher thresholds (±450 millivolts and greater) resulted in the accumulation of increased numbers of erroneous GC sequences, which will be recognized as typically occurring as a result of substantial signal asymmetry in the GC readback signals. For reference, using equation (1) above, the appropriate threshold value would be 300 millivolts (that is, halfway between a $T_{min}$ of 200 millivolts and a $T_{max}$ of 400 millivolts).

It will be recognized that in the embodiments presented thus far with regard to FIGS. 7 through 11, the positive and negative detection thresholds are contemplated as being equal and opposite in magnitude. However, another embodiment is contemplated wherein the magnitudes of the positive and the negative detection thresholds are independently selected and can vary with respect to one another. Although such an approach will generally introduce a certain level of additional processing in order to accommodate the individual optimization of both the positive and the negative detection thresholds for each head-track combination, an important advantage associated with this embodiment is that each threshold will be selected based upon the characteristics of the GC readback signals in relation to that particular threshold (whether positive or negative). Thus, improved optimization can be performed to accommodate even greater amounts of baseline shifting, signal asymmetry, noise, and other factors affecting the GC readback signals.

With reference again to the routine of FIG. 8, in this alternative embodiment it is contemplated that the same general approach discussed above could be used with minor modifications in order to accommodate individual optimization of both positive and negative detection thresholds for each head-track combination. For example, initial values could be selected for the positive detection thresholds and, while maintaining the positive detection thresholds constant, the routine of FIG. 8 could be performed to select optimal negative detection thresholds. The routine could then be performed a second time to optimize the positive detection thresholds while using the previously determined optimal negative detection thresholds.

As will be recognized, nominal threshold values will likely be determined during the design phase of a given disc drive. Accordingly, these nominal threshold values could be used as an initial baseline from which the threshold values can be optimized. Moreover, although it is contemplated that the routine of FIG. 8 could be advantageously performed during the manufacturing of the disc drive 100, the routine could readily be performed during the operational life of the disc drive 100 as well, either during idle operational periods, initialization periods, or as part of a calibration routine initiated in response to the occurrence of a substantial number of erroneous sequences (such as for one particular track location, one particular head or for all of the tracks in the disc drive 100).

Accordingly, in view of the foregoing it will be recognized that the present invention is directed to an apparatus and method for optimizing detection thresholds used to identify addresses of tracks in a disc drive (such as 100) having a head (such as 118) and a disc (such as 108) upon which a plurality of tracks (such as 160) are defined, the tracks including track address fields (such as 170) in which track address information is stored. The head is controllably positionable with respect to the tracks by way of a servo circuit (such as 150).

The servo circuit is provided with a comparator (such as 224) which generates track address sequence signals in response to a corresponding plurality of readback signals (such as 180, 200) obtained as the head is maintained in a fixed relationship to a selected track. A demodulator (such as 230) identifies erroneous track address sequence signals therefrom and increments a count in an accumulator (such as 232) for each detected, erroneous signal. A detection threshold circuit (such as 152, 226, 228) sequentially provides the comparator with a set of detection thresholds (such as 190, 192, 210, 212) from a population of detection thresholds, each of which are used in turn by the comparator. An optimal set of thresholds is thereby selected for use by the disc drive in accordance with the relative number of erroneous track address sequence signals accumulated for each of the detection thresholds from the population.

For purposes of the appended claims, it will be understood that the term "circuit" will include both hardware and software implementations. Moreover, although the preferred embodiments presented above have utilized track address information arranged in the form of Gray code, it will be recognized that the present invention as claimed is not so limited. Further, the use of the term "signal" in the appended claims will be readily understood to cover both analog and digital implementations.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. A method for selecting an optimal detection threshold used to identify addresses of tracks in a disc drive, the disc drive having a head controllably positionable adjacent a surface of a rotatable disc on which the tracks are defined, the method comprising steps of:

(a) positioning the head over a selected track and generating a plurality of readback signals from track address fields associated with the selected track, the readback signals having baseline portions, peaks with positive polarity with respect to the baseline portions and peaks with negative polarity with respect to the baseline portions;

(b) generating a first set of track address sequence signals through the comparison of selected readback signals to a first detection threshold, the first detection threshold having a selected magnitude and polarity with respect to the baseline portions;

(c) accumulating a total count of erroneous track address sequence signals from the first set of track address sequence signals;

(d) generating a second set of track address sequence signals through the comparison of selected readback signals to a second detection threshold, the second detection threshold having a different magnitude, but the same selected polarity, as the first detection threshold;

(e) accumulating a total count of erroneous track address sequence signals from the second set of track address sequence signals; and (f) selecting the optimal detection threshold in relation to the total counts of erroneous track address sequence signals obtained using the first and second detection thresholds, the optimal detection threshold having the same selected polarity as the first and second detection thresholds.

2. The method of claim 1, wherein each track address sequence signal in the first and second sets of track address sequence signals has a first value for portions of the corresponding readback signal above the respective first or second detection threshold and a second value for portions of the corresponding readback signal below the respective first or second detection threshold.

3. The method of claim 1, wherein the disc drive maintains the head in a fixed relationship to the selected track in response to the detection of each erroneous track address sequence signal.

4. The method of claim 1, wherein the selected track is disposed at a first diameter on the surface of the disc, wherein the steps (a) through (f) are subsequently performed for a second selected track at a second diameter on the surface of the disc, and wherein optimal detection thresholds are selected for tracks at remaining diameters on the surface of the disc in relation to the optimal detection thresholds selected for the tracks at the first and second diameters.

5. The method of claim 1, wherein the addresses of the tracks are encoded using Gray code.

6. The method of claim 1, wherein the selected polarity of the first detection threshold, the second detection threshold and the optimal detection threshold is positive with respect to the baseline portions, and wherein steps (b) through (f) are repeated using a negative polarity for the selected polarity so that optimal positive and negative detection thresholds, respectively, are obtained.

7. The method of claim 6, wherein the optimal positive detection threshold has a magnitude that is different from a magnitude of the negative detection threshold.

8. A servo circuit for positioning a head relative to tracks on a surface of a disc in a disc drive, each track having a track address indicative of the relative location of the track with respect to the surface of the disc, the servo circuit comprising:

a comparator generating a plurality of track address sequence signals in response to a corresponding plurality of readback signals from the head, each readback signal obtained as the head reads each of a plurality of track address fields from a selected track, the comparator comparing the readback signal to a detection threshold having a selected polarity with respect to baseline portions of the readback signal;

a demodulator, responsive to the comparator, identifying erroneous track address sequence signals from the plurality of track address sequence signals;

an accumulator, responsive to the demodulator, accumulating a count indicative of a total number of erroneous track address sequence signals; and a detection threshold circuit providing the selected detection threshold to the comparator from a population of detection thresholds having different respective magnitudes, but the same selected polarity, the detection threshold circuit in turn selecting and providing each of the detection thresholds from the population, the detection threshold circuit thereafter providing an optimal detection threshold to the comparator, the optimal detection threshold determined in relation to the relative number of erroneous track address sequence signals accumulated for each of the detection thresholds from the population, the optimal detection threshold having the same selected polarity as the population of detection thresholds.

9. The servo circuit of claim 8, wherein the comparator generates each track address sequence signal so as to have a first value for portions of the corresponding readback signal above the detection threshold and a second value for portions of the corresponding readback signal below the detection threshold.

10. The servo circuit of claim 8, wherein the disc drive maintains the head in a fixed relationship to the selected track in response to the detection of each erroneous track address sequence signal.

11. The servo circuit of claim 8, wherein the selected track is disposed at a first diameter on the surface of the disc, wherein an optimal detection threshold is subsequently determined for a second selected track at a second diameter on the surface of the disc, and wherein optimal detection thresholds are selected for tracks at remaining diameters on the surface of the disc in relation to the optimal detection thresholds selected for the tracks at the first and second diameters.

12. The servo circuit of claim 8, wherein a contiguous range of detection thresholds from the population of detection thresholds is identified with each of the detection thresholds in the range having an accumulated number of erroneous track address sequence signals less than an acceptance threshold, and wherein the optimal detection threshold is selected to have a magnitude that falls proximate a mid-point of the range.

13. A disc drive, comprising:

a head controllably positionable with respect to tracks defined on a rotatable disc, each track having a plurality of track address fields indicative of the relative placement of the track on the disc, the head generating readback signals in response to passage of the track address fields adjacent the head, the readback signals having baseline portions, peaks with positive polarity with respect to the baseline portions and peaks with negative polarity with respect to the baseline portions;

a detection threshold circuit providing a plurality of sets of detection thresholds, each set of detection thresholds comprising a positive threshold having a positive polarity with respect to the baseline portions and a negative threshold having a negative polarity with respect to baseline portions;

a comparator, responsive to the head and the detection threshold circuit, which generates a plurality of track address sequence signals by comparing the readback signals to a selected set of detection thresholds;

a demodulator, responsive to the comparator, which identifies erroneous track address sequence signals from the plurality of track address sequence signals; and an accumulator, responsive to the demodulator, which accumulates a total number of erroneous track address sequence signals identified by the demodulator, wherein the accumulator accumulates a total number of erroneous track address sequence signals for each set of detection thresholds which are provided in turn to the comparator by the detection threshold circuit, and wherein an optimal set of detection thresholds is identified and thereafter used by the disc drive in response to the total numbers of erroneous track address sequence signals.

14. The disc drive of claim 13, wherein the comparator generates each track address sequence signal so as to have a first value for portions of the corresponding readback signal above the selected detection threshold and a second value for portions of the corresponding readback signal below the selected detection threshold.

15. The disc drive of claim 14, wherein the demodulator identifies the erroneous track address sequence signals by detecting differences between the relative placement of the first and second values of the track address sequence signals and corresponding first and second values for a predetermined, nominal track address sequence signal indicative of the address of the selected track.

16. The disc drive of claim 13, characterized in that the disc drive maintains the head in a fixed relationship to the selected track despite the detection of an erroneous track address sequence signal.

17. The disc drive of claim 13, wherein the selected track is disposed at a first diameter on the surface of the disc, wherein an optimal detection threshold is subsequently determined for a second selected track at a second diameter on the surface of the disc, and wherein optimal detection thresholds are selected for tracks at remaining diameters on the surface of the disc in relation to the optimal detection thresholds selected for the tracks at the first and second diameters.

18. The disc drive of claim 13, wherein Gray code is used to identify the relative placement of the tracks on the disc.

* * * * *